(12) United States Patent
Ragab et al.

(10) Patent No.: US 8,165,230 B2
(45) Date of Patent: Apr. 24, 2012

(54) DOPPLER FREQUENCY ESTIMATION IN WIRELESS COMMUNICATION SYSTEMS

(75) Inventors: Ahmed Ragab, Omrania Sharkia (EG); Nabil Yousef, Foothill Ranch, CA (US)

(73) Assignee: Newport Media, Inc., Lake Forest, CA (US)

( * ) Notice: Subject to any disclaimer, the term of this patent is extended or adjusted under 35 U.S.C. 154(b) by 1031 days.

(21) Appl. No.: 12/110,602

(22) Filed: Apr. 28, 2008

(65) Prior Publication Data

US 2009/0323789 A1 Dec. 31, 2009

(51) Int. Cl.
*H04K 1/10* (2006.01)
*H04L 27/28* (2006.01)
(52) U.S. Cl. ............. 375/260; 375/150; 375/224
(58) Field of Classification Search ........... 375/150, 375/224, 260
See application file for complete search history.

(56) References Cited

U.S. PATENT DOCUMENTS

| | | | | |
|---|---|---|---|---|
| 2002/0034944 A1* | 3/2002 | Tanno et al. | ............. | 455/434 |
| 2006/0007904 A1* | 1/2006 | Shimomura et al. | ......... | 370/342 |
| 2006/0062317 A1* | 3/2006 | Chang et al. | ............. | 375/260 |
| 2006/0215778 A1* | 9/2006 | Murthy et al. | ............. | 375/260 |
| 2007/0133699 A1* | 6/2007 | Roh et al. | ............. | 375/260 |
| 2008/0285640 A1* | 11/2008 | McCallister et al. | ......... | 375/233 |
| 2010/0128808 A1* | 5/2010 | Ro et al. | ............. | 375/260 |

* cited by examiner

*Primary Examiner* — Shuwang Liu
*Assistant Examiner* — Sung Ahn
(74) *Attorney, Agent, or Firm* — Rahman LLC (57) ABSTRACT

An apparatus and method for estimating Doppler frequency in a wireless communication network, wherein the method comprises determining a first correlation coefficient (c1) between a currently received Orthogonal Frequency Division Multiplexed (OFDM) symbol and an OFDM symbol received previous to the currently received OFDM symbol, and a second correlation coefficient (c2) between the currently received OFDM symbol and an OFDM symbol received immediately previous to the OFDM symbol received previous to the currently received OFDM symbol; performing a leaky integration across OFDM symbols of the resulting first and second correlation coefficients (c1, c2) to obtain an estimate of the first and second correlation coefficients; dividing the second correlation coefficient (c2) by the first correlation coefficient (c1) to obtain a correlation coefficient ratio; and using the correlation coefficient ratio as an estimate of the Doppler frequency in the wireless communication system.

20 Claims, 9 Drawing Sheets

DOPPLER FREQUENCY ESTIMATION IN WIRELESS COMMUNICATION SYSTEMS

BACKGROUND

1. Technical Field

The embodiments herein generally relate to wireless communications, and, more particularly, to a method and apparatus for Doppler frequency estimation for Digital Video Broadcasting-Handheld (DVB-H) systems.

2. Description of the Related Art

Doppler frequency is of great importance in mobile communication systems. It relates directly to the velocity of the vehicle through the equation: $f_d = v/\lambda = (v/c)*fc$, where $f_d$ is the Doppler frequency, v is the relative velocity between the transmitter and the receiver, $\lambda$ is the wavelength of the transmitted signal, c is the speed of light in free space and fc is the carrier frequency. Knowledge of the Doppler frequency enables one to adapt the bandwidth of the channel estimation filter and in turn enhance the demodulator performance. In DVB-H systems, time domain interpolation of the scattered pilots to produce a 1 out of 3 estimate for the channel can be adapted if the Doppler frequency is known. This is because in Rayleigh fading channels, it is observed that the power spectral density of one bin in time has the common U-shaped power spectral density with maximum frequency of $f_d$.

Different methods have been proposed to estimate Doppler frequency for DVB-H systems. These methods include, for example, the Level Crossing Rate (LCR) method, the covariance based method, and the autocorrelation method. For an example, in the autocorrelation method, the autocorrelation of the in-phase and quadrature-phase components of the received signal may be given by:

$$c_r(\tau) = \text{real}(E(r(k)r^*(k+\tau))) = (\Omega/2)J_0(2\pi f_d\tau) + (N_0/2)\delta(\tau) \quad (1)$$

where r(k) is the received signal at sub-carrier index k, $\Omega/2$ is the variance of the received signal, $J_0$ is the zeroth-order Bessel function of the first kind, and $f_d$ is the Doppler frequency.

In actual cases, the $\delta$-function is replaced by a sinc function with certain noise bandwidth. A good estimate of the Doppler frequency can be obtained by calculating the autocorrelation of the received signal if the noise term $((N_0/2)\delta(\tau))$ in equation (1) is neglected.

However, if the correlation function of a received symbol and itself is calculated, the noise would correlate with itself, and thus, the noise term in equation (1) would dominate. To overcome this, as it is well-known that in DVB-Terrestrial/Handheld (T/H), the structure of the pilots repeats each four symbols, the correlation between the current symbol and a stored version of the symbol that is four symbols back in time is calculated. Thus, in this case the noise would not correlate and the noise term can be neglected.

However, as equation (1) of the autocorrelation method is dependent on the received signal variance $\Omega/2$, accurate calculation of the received signal variance requires saving the history of the received signal for a long time. Saving the history of the received signal for a long time is not accepted from a hardware implementation perspective. To augment this, a ratio between c4 and c8 is calculated, where cx is the correlation coefficients between the current symbol and the symbol that is x-symbols back in time. The ratio c4/c8 may be given by:

$$c8/c4 = J_0(2\pi f_d*8T_s)/J_0(2\pi f_d*4T_s) \quad (2)$$

It can be observed that in equation (2), $f_d$ is the only unknown term. Thus, by using the relation of equation (2), a good estimate of $f_d$ by using a look-up table of the Bessel function values is obtained.

Alternatively, a ratio c4/c0 instead of c8/c4 can be determined to save the buffering memory. However, in determining c0, which is the correlation of the received symbol with itself, a noisy term is generated. The correlation ratio c4/c0 may be given by:

$$c4/c0 = ((\Omega/2)J_0(2\pi f_d*4T_s))/((\Omega/2)+(N_0/2)) \quad (3)$$

Equation (3) can be approximated to $c4/c0 = J_0(2\pi f_d*4T_s)$ in high signal to noise ratio (SNR) conditions. However, equation (3) gives a very bad result in low SNR conditions making the estimation method SNR dependent. Therefore, the correlation ratio c8/c4 is used, as the same is not dependent on the SNR.

Figure 1A:
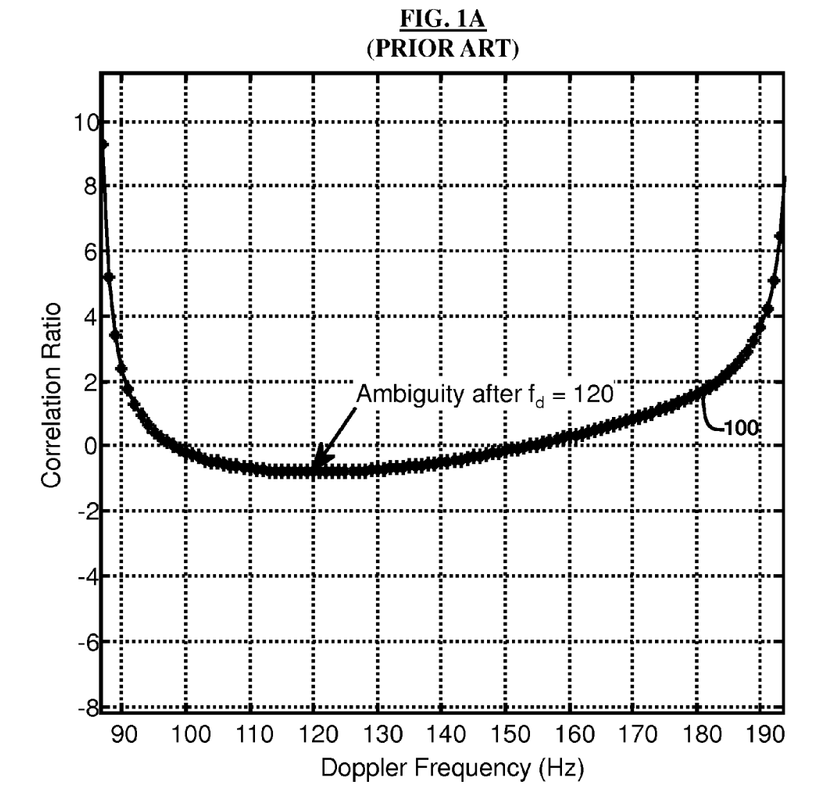
FIG. 1A is a graphical representation of a correlation ratio (c8/c4) curve for Doppler frequencies greater than 92 Hz for 8K mode G1/4 where Ts=1120 μs.

However, the estimation of the Doppler frequency ($f_d$) using equation (2) is appropriate in circumstances where there is a one-to-one mapping between the determined ratio (c8/c4) and the Doppler frequency ($f_d$). This technique fails when two values of $f_d$ map to the same ratio. For example, for 8K mode G1/4 where Ts=1120 µs, the ratio c8/c4 is unique for each Doppler frequency for frequencies up to $f_d$=92 Hz, however, for frequencies above $f_d$=92 Hz some Doppler frequencies give c8/c4 ratios similar to those below $f_d$=92 Hz. Further, for frequencies above $f_d$=120 Hz some ratios repeat again as illustrated in FIG. 1A. Further, as illustrated in the example of FIG. 1A, an ambiguity is encountered when scattered pilots are used to estimate Doppler frequencies above $f_d$=120 Hz. FIG. 1A is a graphical representation of a correlation ratio (c8/c4) curve for scattered pilots at different Doppler frequencies for 8K mode G1/4 where Ts=1120 µs. As illustrated in FIG. 1A, the curve 100 is not unique for the corresponding Doppler frequency. Further, it can be seen that there is a many-to-one mapping between the correlation ratio and the corresponding Doppler frequency.

Thus, to reach high Doppler frequencies as large as 200 Hz, for 8K mode G1/4 where Ts=1120 µs, this technique of using the scattered pilots fails as Doppler frequencies above $f_d$=120 Hz cannot be distinguished from Doppler frequencies up to $f_d$=92 Hz, and above $f_d$=92 Hz and below 120 Hz. In other words, the technique of using scattered pilots generally fails for Doppler frequencies greater than 92 Hz (i.e., it will not distinguish Doppler frequencies higher than 92 Hz from those lower than 92 Hz). The maximum limit of this method can be increased from 92 Hz to 120 Hz if the sign of c4 is used as an extra piece of information (in addition to the ratio of c8/c4). The limitation on the maximum Doppler frequency comes from the large oscillations of the Bessel function in the range of Doppler frequencies of interest which results in many-to-one mapping. The zeroth-order Bessel function of the first kind, $J_0(2\pi f_d\tau)$, wherein $\tau$ is the difference in time, has the property that for a certain $\tau$, the rate of oscillations increase as the maximum allowed Doppler frequency increases. For a certain maximum Doppler frequency, the oscillations increase as $\tau$ increases. Therefore, as the maximum Doppler frequency to be estimated is to be increased, the difference in time is to be decreased.

SUMMARY

In view of the foregoing, an embodiment herein provides a method for estimating Doppler frequency in a wireless communication system, wherein the method comprises determining a first correlation coefficient (c1) between a currently received Orthogonal Frequency Division Multiplexed (OFDM) symbol and an OFDM symbol received previous to the currently received OFDM symbol, and a second correlation coefficient (c2) between the currently received OFDM symbol and an OFDM symbol received immediately previous to the OFDM symbol received previous to the currently received OFDM symbol; performing a leaky integration across OFDM symbols of the resulting first and second correlation coefficients (c1, c2) to obtain an estimate of the first and second correlation coefficients; dividing the second correlation coefficient (c2) by the first correlation coefficient (c1) to obtain a correlation coefficient ratio; and using the correlation coefficient ratio as an estimate of the Doppler frequency in the wireless communication system.

Preferably, the determining of the first correlation coefficient (c1) and the second correlation coefficient (c2) comprises initializing a value of a leaky integrator forgetting factor to a value of an acquisition forgetting factor; initializing a counter to a value zero; initializing an averaging counter to a value zero; filling a 3-symbol First In First Out (FIFO) buffer with the currently received OFDM symbol, the OFDM symbol received previous to the currently received OFDM symbol, and the OFDM symbol received immediately previous to the OFDM symbol received previous to the currently received OFDM symbol; placing the first correlation coefficient (c1) and the second correlation coefficient (c2) at each bin; and summing the first correlation coefficient (c1) and the second correlation coefficient (c2) over all bins.

Also, the determining of the first correlation coefficient (c1) and the second correlation coefficient (c2) is performed using continual pilots, wherein the use of continual pilots instead of scattered pilots increases the maximum allowable Doppler frequency that can be estimated without ambiguity and decreases memory required for estimating the Doppler frequency, wherein the use of continual pilots enables faster results as continual pilots exist in the same positions regardless of the symbol index associated with the OFDM symbol. Moreover, the obtaining of the correlation coefficient ratio by dividing the second correlation coefficient (c2) by the first correlation coefficient (c1) reduces the noise effect on the Doppler frequency estimation substantially and removes the need to observe the signal for a long time to determine its variance. Furthermore, the performing of the leaky integration across OFDM symbols of the resulting first and second correlation coefficients (c1, c2) to obtain an estimate of the first and second correlation coefficients preferably comprises switching adaptively between low and high bandwidth forgetting factors.

The method may further comprise determining if the value of the counter is equal to the value of a predefined register. Additionally, the method may further comprise determining if a value of the averaging counter is equal to a value of an averaging window size to obtain a short-term estimate of the correlation coefficient ratio. Moreover, the method may further comprise incrementing the averaging counter by one. Also, the method may further comprise comparing the short-term estimate of the instantaneous non-leaky-integrated correlation coefficient ratio with the resulting long-term leaky-integrated divided correlation coefficient to determine if a predetermined threshold is reached.

Another embodiment provides an apparatus for estimating Doppler frequency in a wireless communication system, wherein the apparatus comprises a first buffering module adapted to generate a complex conjugate of an Orthogonal Frequency Division Multiplexed (OFDM) symbol (r1*) received previous to a currently received OFDM symbol (r0); a second buffering module adapted to generate a complex conjugate of an OFDM symbol (r2*) received one symbol before the OFDM symbol received previous to the currently received OFDM symbol (r0); a first processing module adapted to calculate the real part of the multiplication result of the currently received OFDM symbol (r0) and the complex conjugate of the OFDM symbol (r1*) received previous to the currently received OFDM symbol (r0) at each bin and adapted to sum the calculated real part of the multiplied results over all bins; a second processing module adapted to calculate the real part of the multiplication result of the currently received OFDM symbol (r0) and the complex conjugate of the OFDM symbol (r2*) received immediately previous to the OFDM symbol received previous to the currently received OFDM symbol (r0) at each bin and adapted to sum the calculated real part of the multiplied results over all bins; a first leaky integrator adapted to leaky integrate the resulting output of the first processing module; a second leaky integrator adapted to leaky integrate the resulting output of the second processing module; and a divider adapted to divide the resulting output of the second leaky integrator by the resulting output of the first leaky integrator.

The apparatus may further comprise a third processing module adapted to map the resulting output of the divider to a time domain filter, wherein the time domain filter is as wide as the channel; and a hysteresis circuit adapted to prevent cutting of a significant part of the channel caused by the time domain filter. Preferably, the time domain filter adapts its bandwidth in accordance to the estimated Doppler frequency to provide an improvement in system performance as the time domain filter which is as wide as a U-shaped spectrum associated with the channel can remove part of the out-of-band noise.

Moreover, the hysteresis circuit preferably prevents choosing a wrong time domain filter which may result if instantaneous noisy estimates are responded and enables quickly tracking possible increases in Doppler frequency and puts a protection on instantaneously responding to decreases in Doppler frequency. Furthermore, the first processing module and the second processing module may be further adapted to divide the summed result by N, wherein N is the total number of pilots per OFDM symbol. Moreover, the first processing module preferably provides a first correlation coefficient (c1) between the currently received OFDM symbol and the OFDM symbol received previous to the currently received OFDM symbol.

Also, the second processing module preferably provides a second correlation coefficient (c2) between the currently received OFDM symbol and the OFDM symbol received immediately previous to the OFDM symbol received previous to the currently received OFDM symbol. Preferably, the first buffering module, the second buffering module, the first processing module, and the second processing module utilize continual pilots. Furthermore, the first leaky integrator and the second leaky integrator may adaptively switch between low and high bandwidth forgetting factors to avoid noisy Doppler frequency estimates. Additionally, the wireless communication system may comprise a DVB-H system.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a technique of estimating high Doppler frequencies using continual pilots so that the difference in time τ in a zeroth-order Bessel function of the first kind may be decreased. Referring now to the drawings, and more particularly to FIGS. 1B through 6, where similar reference characters denote corresponding features consistently throughout the figures, there are shown preferred embodiments.

The embodiments herein provide a technique for Doppler frequency estimation for DVB-H systems. The technique utilizes the continual pilots instead of the commonly used scattered pilots and with the correlation ratio c2/c2:

$$c2/c1 = J_0(2\pi f_d * 2T_s)/J_0(2\pi f_d * 1T_s) \quad (4)$$

Continual pilots exist at the same location for each OFDM symbol, therefore, the difference in time is only 1*Ts, where Ts is the OFDM symbol time. In this technique, a ratio c2/c1 is considered instead of c8/c4, where cx denotes a correlation between a current symbol and its x-symbols predecessor.

Figure 1B:
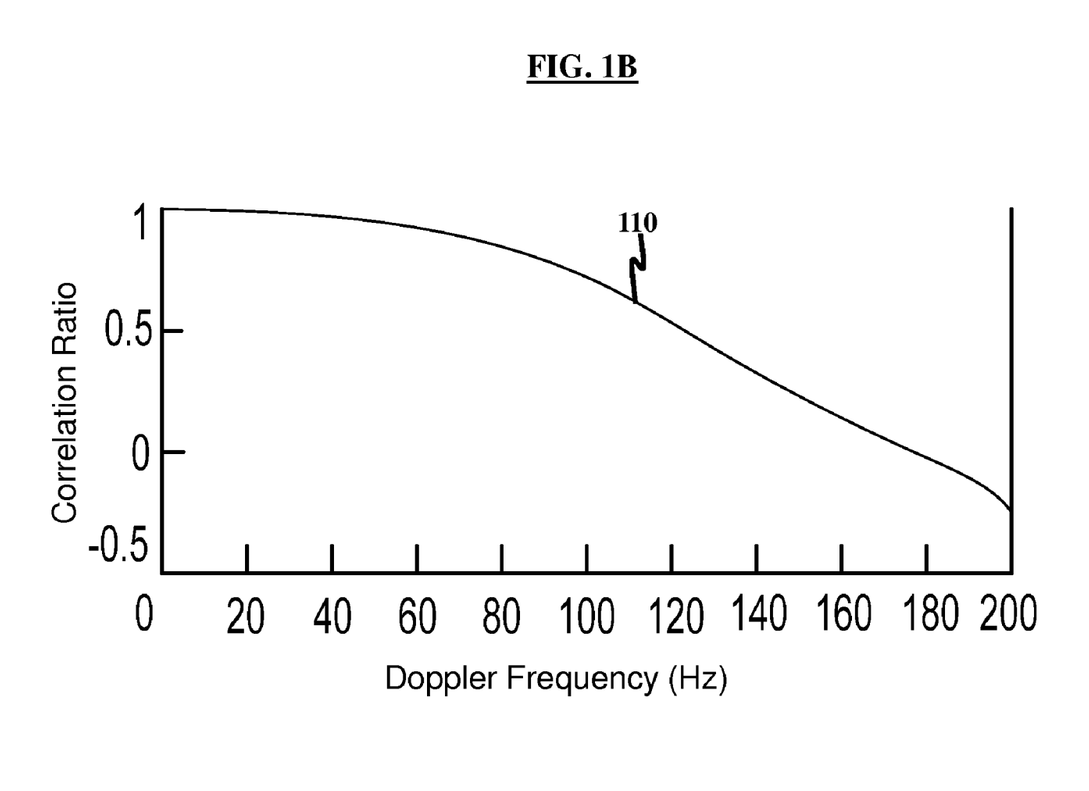
FIG. 1B is a graphical representation of a correlation ratio (c2/c1) curve for different Doppler frequencies for 8K mode G1/4 where Ts=1120 μs.

FIG. 1B is a graphical representation of a correlation ratio (c2/c1) curve 110 for different Doppler frequencies for 8K mode G1/4 where Ts=1120 μs. In FIG. 1B, there is a one-to-one mapping between the correlation ratio and the corresponding Doppler frequency. By contrast, the many-to-one mapping for the scattered pilots of FIG. 1A, exhibits many problems for estimating high Doppler frequencies.

From equation (1), it is seen that cx may be obtained by determining the expected value of the current received symbol and the one delayed by x symbols at the pilots positions. The expected value may be determined by multiplying the two signals, namely the current symbol and the complex conjugate of the delayed symbol, at the pilots' locations, and then the resulting multiplied signal may be averaged to obtain an approximate estimate to the expected value and further, the correlation coefficient.

The exact determination of the expected value requires observing the signal for a long time. With the increase in the number of pilots, a better estimate of the expected value is obtained. However, in the case of continual pilot's technique, the number of continual pilots is smaller than the number of the commonly used scattered pilots. For example, in 8K sub-carrier mode there are 177 continual pilots versus 524 scattered pilots and in 2K sub-carrier mode (worst case), there are 45 continual pilots and 131 scattered pilots.

To obtain a good estimate of the expected value, this technique performs a leaky integration of the determined correlation coefficient (expected value) across different OFDM symbols and chooses the forgetting factors perfectly for the leaky integrator. Thus, a good estimate of the correlation coefficient is obtained by this technique even in the 2K sub-carrier mode.

Figure 2:
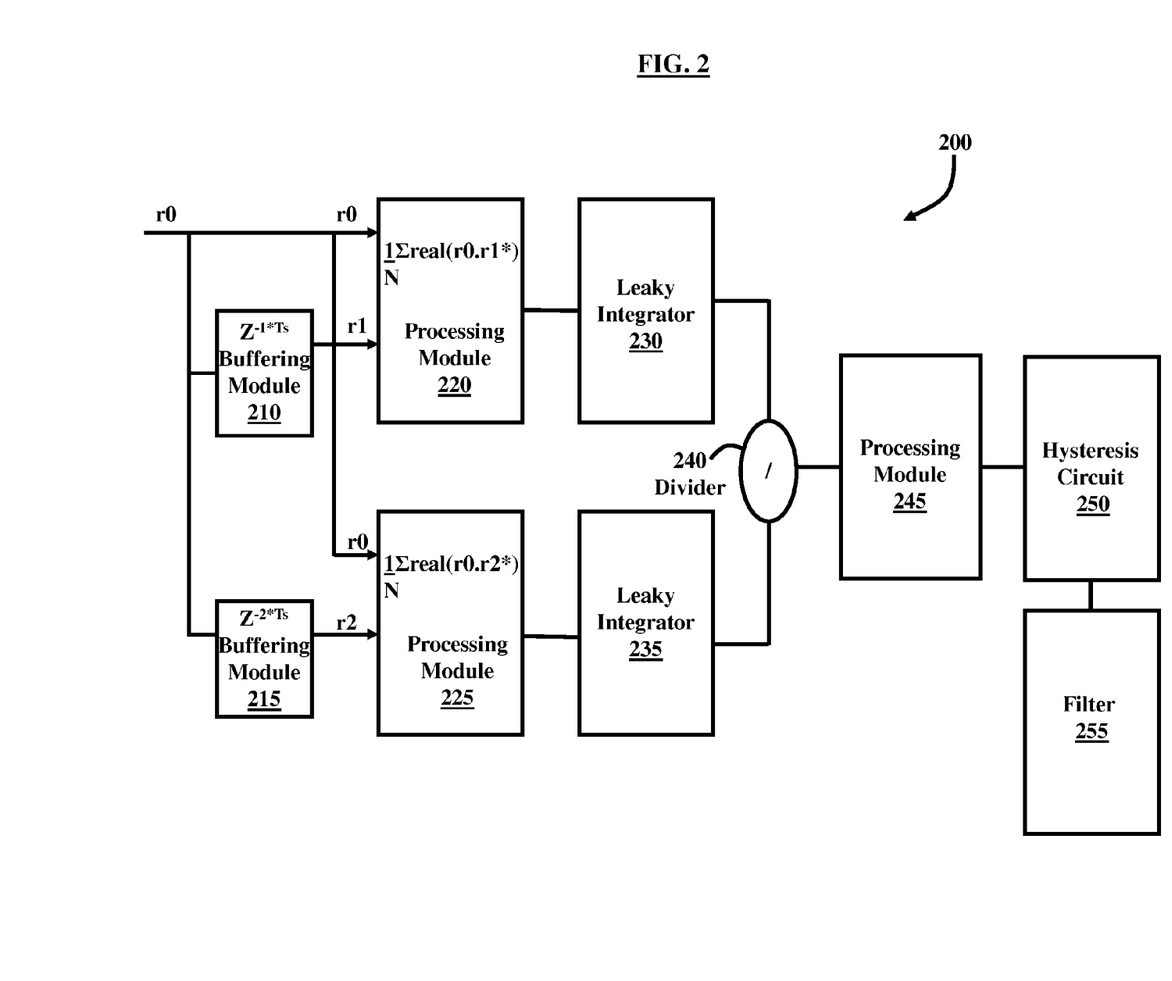
FIG. 2 illustrates a block diagram of a Doppler frequency estimator according to an embodiment herein.

FIG. 2 illustrates a block diagram of a Doppler frequency estimator 200 according to an embodiment herein. In an embodiment, as only the raw continual pilots of three symbols, namely, the current, the previous and the one before the previous are to be stored, a First In First Out (FIFO) buffer of size 3*number of continual pilots per symbol is used. In an embodiment, a buffer size 3*177 is chosen, such that the worst case which is in the 8K sub-carrier mode is accommodated. This is an advantage over the usage of scattered pilots which requires a 9*524 entries buffer. Thus, techniques using scattered pilots require a 9-times larger memory compared to that required for techniques using the continual pilots.

As illustrated in FIG. 2, an estimate to the correlation coefficients c1 and c2 is obtained first. The estimate of the correlation coefficient c1 is obtained by calculating the real part of the multiplication result of the current symbol (r0) with the complex conjugate of the previous symbol (r1*) at the pilots' positions and then by dividing the sum of the calculated real part of the resulting multiplied signal by the total number of pilots per symbol. The estimate of c2 is calculated in the same manner using the current symbol (r0) and the complex conjugate of the symbol before the previous symbol (r2*). Buffering modules 210, 215 are used to store the two previous symbols r1, r2 respectively. In an embodiment, r1 is generated using a delay of $1*Ts(Z^{-1*Ts})$ and r2 is generated using a delay of $2*Ts(Z^{-2*Ts})$, where Ts is the OFDM symbol time. A processing module 220 calculates the real part of the multiplication result of the symbol r0 and the complex conjugate of the previous symbol, r1* at each bin (i.e., each pilot position), sums the calculated real part of the multiplied results over all bins and divides the resulting summed result by N to estimate c1, where N is the total number of pilots per symbol. A processing module 225 calculates the real part of the multiplication result of the symbol r0 and the complex conjugate of the symbol before the previous symbol (r2*) at each bin, sums the calculated real part of the multiplied results over all bins and divides the resulting summed result by N to estimate c2. In an embodiment, the division by N may be omitted for hardware simplicity as the final outcome required is the correlation coefficient ratio (c2/ c1) and not the absolute value of c1 and c2. The resulting divided output from the processing modules 220, 225 is leaky integrated across OFDM symbols by leaky integrators 230, 235 to obtain a good estimate for the correlation coefficients c1, c2, and to prevent instantaneous tracking to sudden changes caused by the noisy pilots' values. Further, the forgetting factors for leaky integration are well chosen to compromise averaging the noisy estimates and tracking fast channel changes. The leaky integrated output c1, c2 from the leaky integrators 230, 235 are then divided by a divider 240 to achieve the required ratio c2/c1.

An advantage of knowing the Doppler frequency in DVB-T/H systems is to make adaptation to the time domain filter bandwidth. The power spectral density of one bin in time takes the common U-shaped spectrum with a maximum frequency of $f_d$. Instead of using a wide time domain filter that accommodates any channel, the time domain filter bandwidth may be adaptively changed according to the estimated Doppler frequency. Accordingly, in an embodiment, a filter that is only as wide as the U-shaped spectrum associated with the channel is used so that a significant improvement in the performance is achieved compared to use of one wide filter for all channels.

A processing module 245 maps the ratio c2/c1 to a time domain filter 255. In an embodiment, the index of the time domain filter 255 is first provided to a hysteresis circuit (fast attack slow decay) 250. This is performed to track the increase in the filter index fast and in case the filter index decreases, then, in that case the decrease is tracked slowly to make sure that the Doppler frequency is really decreasing and is not an outcome of a noisy estimation. Thus, in circumstances wherein a filter that is much wider than the channel is chosen by mistake, only some noise is allowed to come in band which is not a significant problem (depending on the SNR and on how wide the selected filter is compared to the channel). However, in cases wherein a filter that is tighter than the channel is chosen, significant part of the channel is cut which may significantly degrade the performance (depending on the SNR and on how tight the selected filter is compared to the channel) as some of the information about the channel is lost. For this purpose the hysteresis circuit 250 is used, which provides protection against wrongly cutting a part of the channel.

In cases where the Doppler frequency itself is to be obtained, processing module 245 employs a look-up table mapping the calculated correlation ratio to the corresponding Doppler frequency. However, in accordance with the embodiments herein, namely time domain filter bandwidth adaptation, only the bandwidth of a suitable time domain filter needs to be estimated. In the embodiments herein, it is assumed that there exists a bank of time domain filters with predetermined filter cutoffs. Instead of having a look-up table with the pair correlation ratio—Doppler frequency for all Doppler frequencies in the range of interest, only the set of filter cutoffs expressed as correlation ratios (as long as a one-to-one mapping between Doppler frequency and correlation ratio is achieved) needs to be stored. This saves significant memory storage by eliminating the need to go to the Doppler frequency domain. The same may be employed for other applications where only relative channel behavior is to be considered not the absolute Doppler frequency.

Figure 3A:
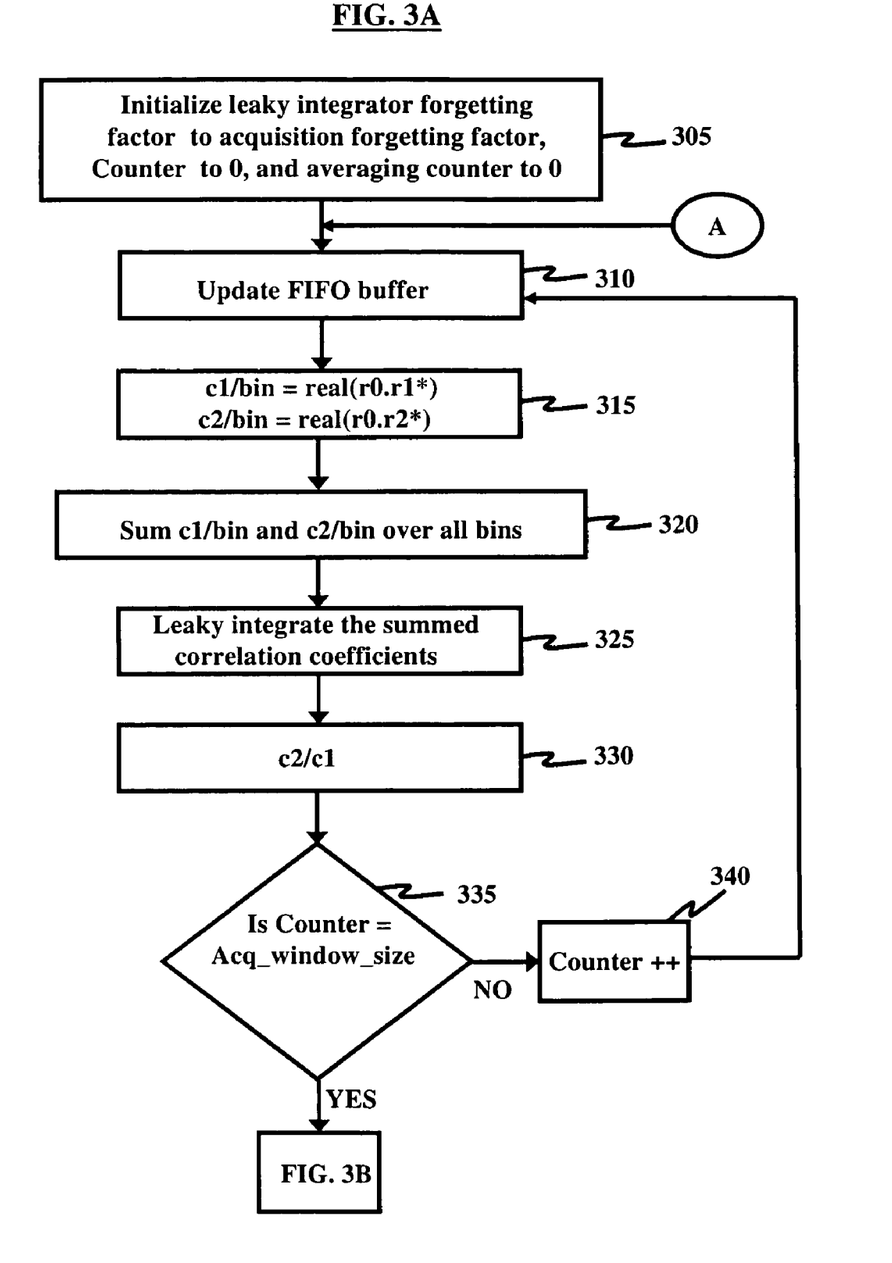
FIGS. 3A and 3B illustrate a flow diagram of one embodiment of a technique for estimating Doppler frequency in DVB-H systems.
Figure 3B:
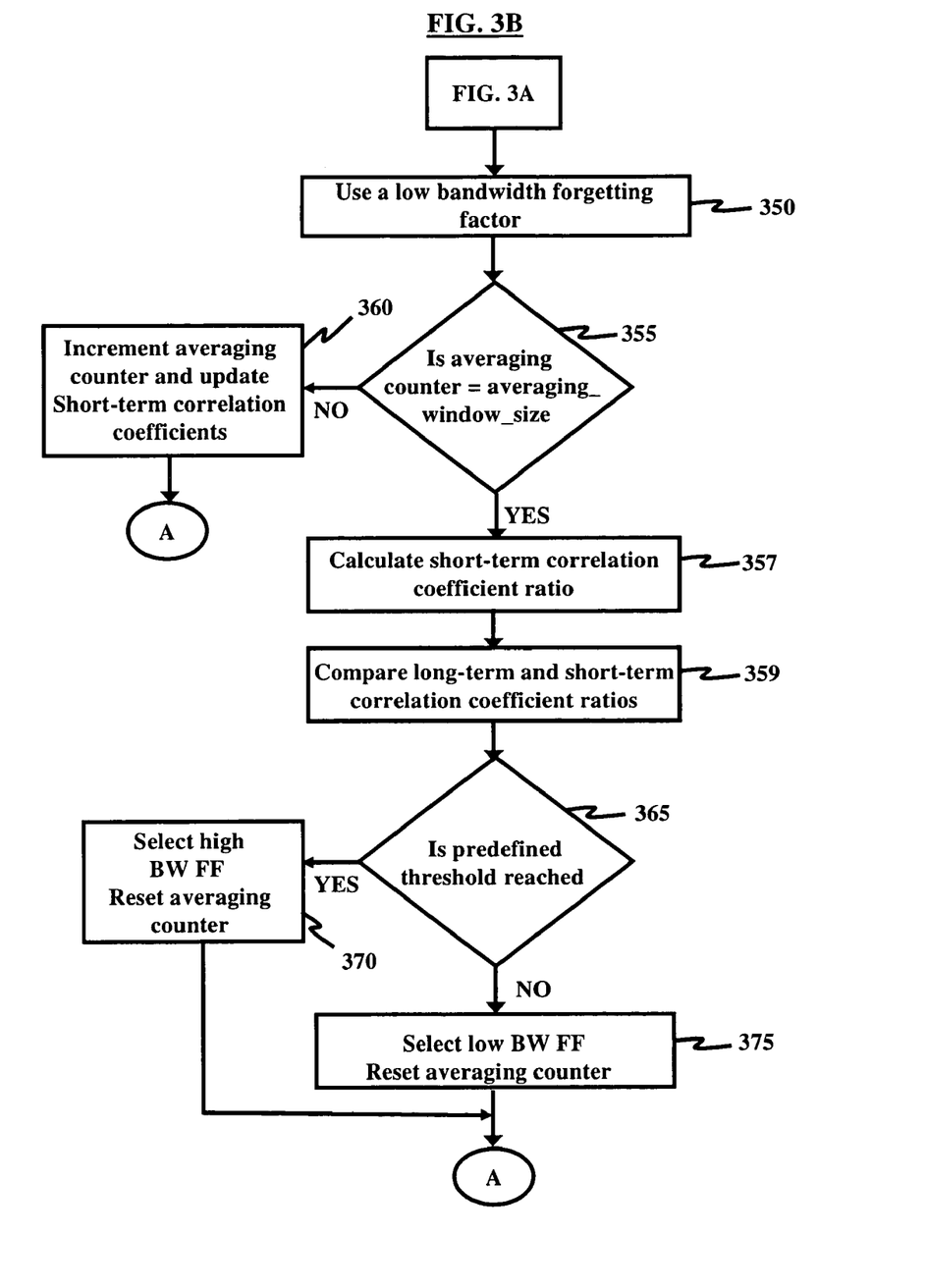

FIGS. 3A and 3B illustrate a flow diagram of one embodiment of a technique for estimating Doppler frequency in DVB-H systems. At block 305, a leaky integrator forgetting factor is initialized to a value of an acquisition forgetting factor, a counter is initialized to a value zero, and an averaging counter is initialized to a value zero. Next, at block 310, a 3-symbols FIFO buffer is updated by filling the FIFO buffer with the raw continual pilots of the 3 symbols: the current, the previous and the one before the previous. Moving to block 315, correlation coefficients c1 and c2 are determined at each bin. In an embodiment, the correlation coefficient c1 may be determined as the real part of the product of r0 of FIG. 2 and r1* of FIG. 2, and the correlation coefficient c2 may be determined as the real part of the product of r0 of FIG. 2 and r2* of FIG. 2. Next, at block 320, the values so obtained at each bin are summed over all bins. In an embodiment, at block 325, the obtained correlation coefficients are leaky integrated to smooth out the noisy sudden changes. Next, at block 330, a ratio c2/c1 is determined using the resulting leaky integrated correlation coefficients c1 and c2. Moving to block 335, it is determined if the value of the counter is equal to a value of a predefined register Acq_window_size. The register Acq_window_size is set to a value that guarantees the acquisition of the unknown Doppler frequency for various channel conditions. The act of block 335 is processed so that the acquisition forgetting factor is used for a time equal to the predefined register Acq_window_size. In case the counter is not equal (No) to the register Acq_window_size, the counter is incremented at block 340. If the counter is equal (Yes) to the register Acq_window_size, the process continues to block 350.

At block 350, at the start of the tracking phase, a low bandwidth forgetting factor is utilized. Next, at block 355, to determine an average of the calculated instantaneous non-leaky integrated correlation ratio history over a window of size averaging_window_size, it is determined if value of the averaging counter is equal to a value of an averaging_window_size. This creates a short-term estimate for the correlation ratio. In case the value of the averaging counter is not equal (No) to the value of the averaging_window_size, then, at block 360, the averaging counter is incremented by one, the short-term correlation coefficient calculation is updated and the acts of blocks 310 through 355 are processed again. In case the value of the averaging counter is equal (Yes) to the value of the averaging_window_size, then, at block 357, the short-term correlation coefficient ratio is calculated. After this, at block 359, the long-term and short-term correlation coefficient ratios are compared. Next, at block 365, the short-term value is compared to the long-term leaky integrated value resulting from the divider 240 of FIG. 2, to determine if a predefined deviation threshold is reached. In case the predefined deviation threshold is reached (Yes), then at block 370, a high bandwidth forgetting factor is selected and the averaging counter is reset. If the predefined deviation threshold is not reached (No) at block 365, then at block 375 a low bandwidth forgetting factor is selected and the averaging counter is reset. After resetting the averaging counter at blocks 370 or 375, the entire process repeats again including comparing the long term and the short term ratios after another averaging_window_size period. Using both the low and high BW forgetting factors in this adaptive way makes a perfect compromise between quickly tracking Doppler frequency changes and not responding to instantaneous noisy changes.

Figure 4A:
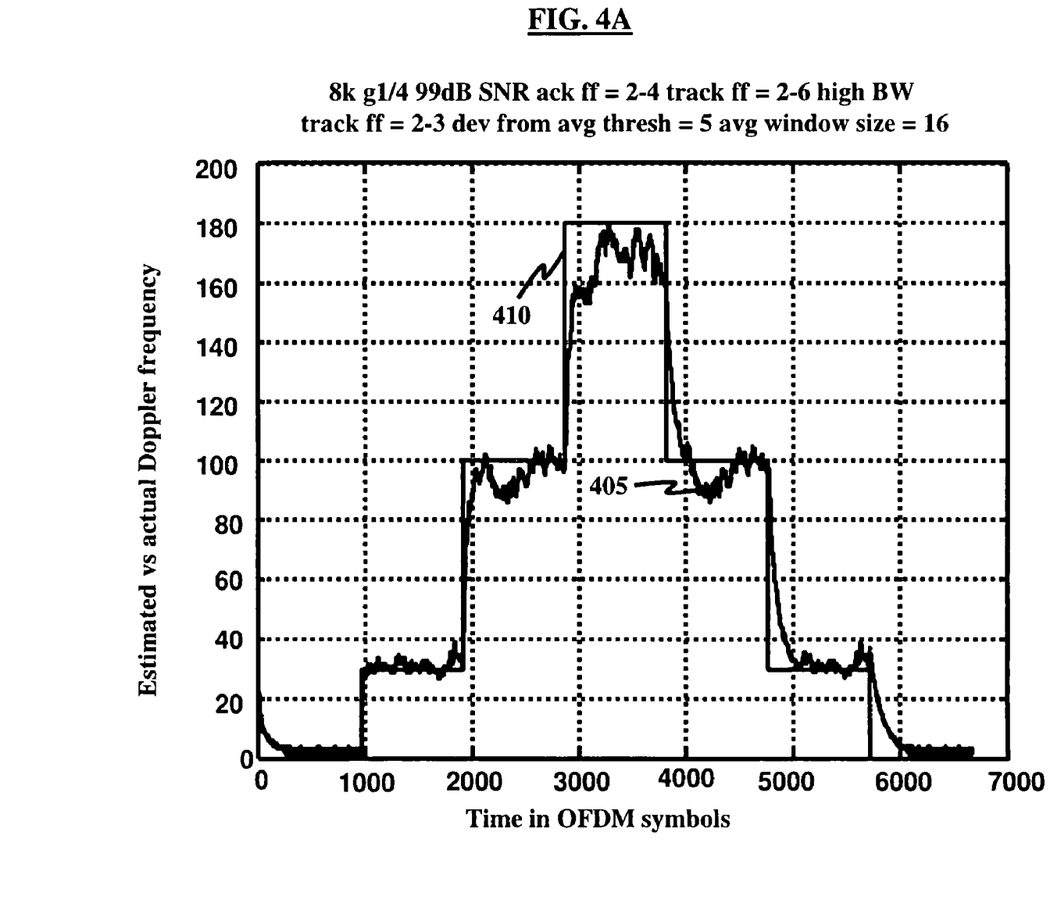
FIGS. 4A and 4B are graphical illustrations representing the performance of the method illustrated in FIGS. 3A and 3B in accordance with the embodiments herein.
Figure 4B:
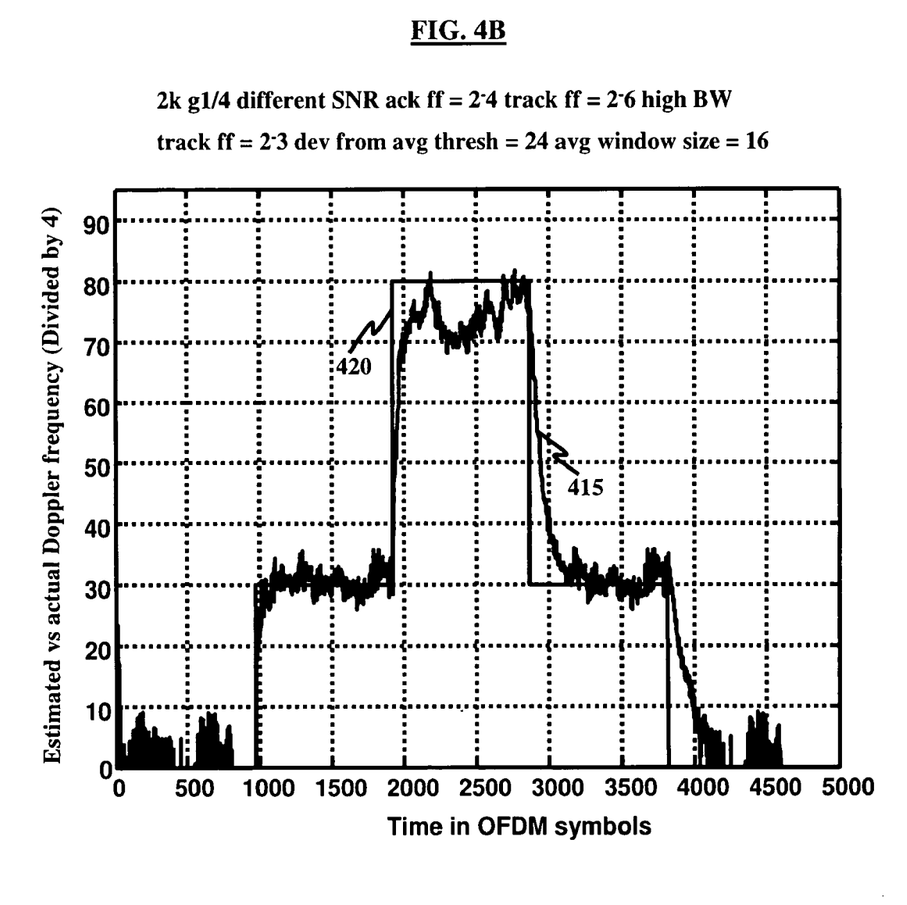

FIGS. 4A and 4B are graphical illustrations representing the performance of the method illustrated in FIGS. 3A and 3B in accordance with the embodiments herein. The performance illustrated in FIG. 4A is for an 8K mode G1/4 with no applied AWGN noise. In the present simulation, the Doppler frequency is changed abruptly to determine how fast the method illustrated in FIGS. 3A and 3B can track these changes. The applied Doppler frequency changes as follows: 0->30->100->180->100->30->0 Hz. The curve 405 illustrates the estimated Doppler frequency and the curve 410 illustrates the actual Doppler frequency.

Forgetting factors and window sizes for the present simulation are chosen to satisfy certain criteria, such as, an acquisition time of 50 OFDM symbols or less and a steady state error of about 10 Hz. It is to be noted that the present simulation represents an extreme non-practical case, as in actual cases the Doppler frequency cannot change abruptly the way it is being changed in the present example except if the stop-sign situation is considered.

At very high Doppler frequencies, such as 180 Hz, it can be seen that the estimator is down biased. However, it is usually not a strict requirement to exactly calculate very high Doppler frequencies. It may be satisfactory to show that the Doppler frequency in this situation is above a certain value, for example if it is above 150 Hz. An example to the relaxation of this requirement is when using the Doppler frequency information to adapt the bandwidth of the time domain interpolator. In this case, the exact value of the Doppler frequency is not required to be considered; instead, the range of the Doppler frequency is to be considered, which is then mapped to a certain time domain filter. For DVB_T/H, at very high Doppler frequencies, such as 180 Hz, it is advisable to remove the time domain filter altogether to prevent aliasing problems. Thus, it is not considered, whether the Doppler frequency is 180 Hz or 160 Hz, it is concluded that the time domain filter must be removed.

FIG. 4B illustrates the performance of the method of FIGS. 3A and 3B under the following two stressing conditions: (i) 2K mode, which means that the number of continual pilots is limited (45 CP's); and (ii) AWGN noise is added with an SNR that is lower than the minimum working SNR at the specified Doppler frequency. It can be observed from FIGS. 4A and 4B that even under these worst-case conditions, the method illustrated in FIGS. 3A and 3B satisfies the required criteria.

At 0 Hz Doppler frequency, it can be observed that the Doppler frequency estimation is little bit noisy. The is because at high Doppler frequencies the result may be approximated to be the combination of two components: the Doppler component at a high freq. (approximating the U-shape spectrum to a single frequency at Fd), and the AWGN component at low frequency and with low power. Thus, at high Doppler frequencies, the estimation is not affected by the AWGN component. However, at low Doppler frequencies the effect of the noise dominates. However, it is to be noted here that the present methodology satisfies the 50 OFDM symbols acquisition time and 10 Hz steady state error criteria. The curve 415 illustrates the estimated Doppler frequency divided by four for comparison with the 8K mode and the curve 420 illustrates the actual Doppler frequency divided by four for the same reason.

Figure 5:
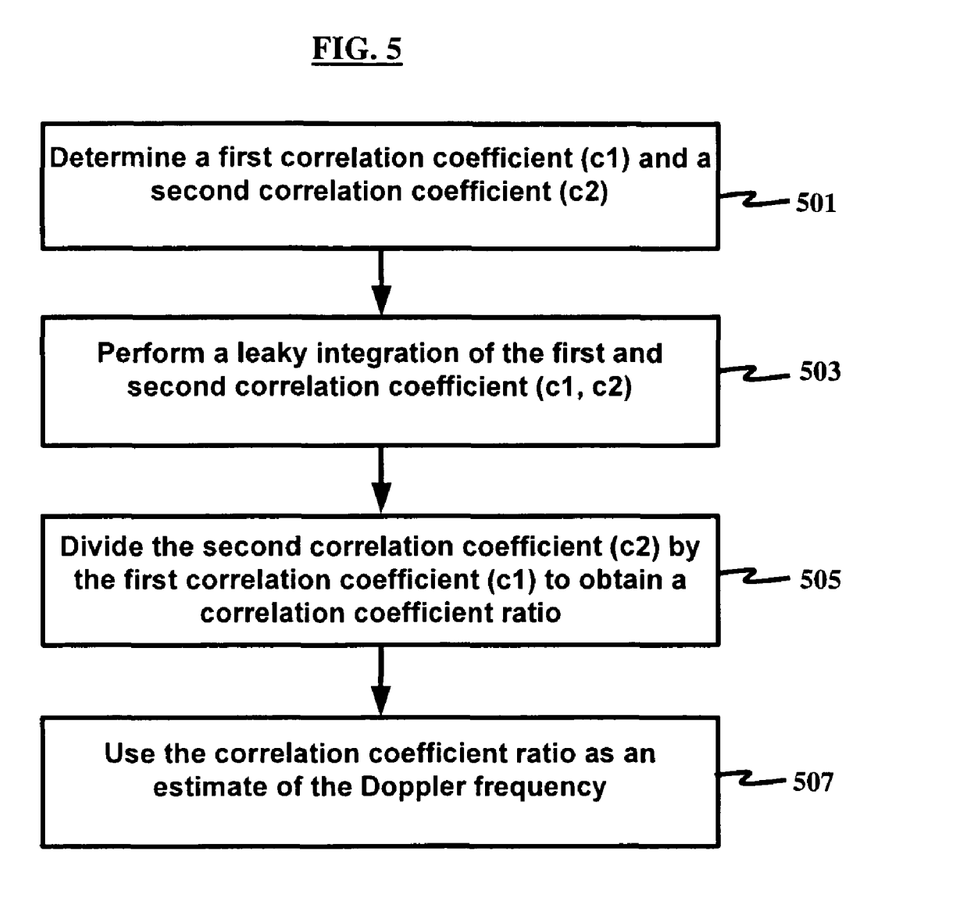
FIG. 5 is a flow diagram illustrating a preferred method according to an embodiment herein.

FIG. 5, with reference to FIGS. 1 through 4B, is a flow diagram that illustrates a method of estimating Doppler frequency in a wireless communication system according to an embodiment herein, wherein the method comprises determining (501) a first correlation coefficient (c1) between a currently received OFDM symbols and an OFDM symbol received previous to the currently received OFDM symbol, and a second correlation coefficient (c2) between the currently received OFDM symbol and an OFDM symbol received immediately previous to the OFDM symbol received previous to the currently received OFDM symbol; performing (503) a leaky integration across OFDM symbols of the resulting first and second correlation coefficients (c1, c2) to obtain an estimate of the first and second correlation coefficients; dividing (505) the second correlation coefficient (c2) by said first correlation coefficient (c1) to obtain a correlation coefficient ratio; and using (507) the correlation coefficient ratio as an estimate of said Doppler frequency in said wireless communication system.

Preferably, determining (501) the first correlation coefficient (c1) and the second correlation coefficient (c2) comprises initializing a value of a leaky integrator forgetting factor to a value of an acquisition forgetting factor; initializing a counter to a value zero; initializing an averaging counter to a value zero; filling a 3-symbol First In First Out (FIFO) buffer with the currently received OFDM symbol, the OFDM symbol received previous to the currently received OFDM symbol, and the OFDM symbol received immediately previous to the OFDM symbol received previous to the currently received OFDM symbol; placing the first correlation coefficient (c1) and the second correlation coefficient (c2) at each bin; and summing the first correlation coefficient (c1) and the second correlation coefficient (c2) over all bins.

Preferably, the determining of the first correlation coefficient (c1) and the second correlation coefficient (c2) is performed using continual pilots, wherein the use of continual pilots increases the maximum allowable Doppler frequency that can be estimated without ambiguity and decreases memory required for estimating the Doppler frequency. Moreover, the using of continual pilots enables faster results as continual pilots exist in the same positions regardless of the symbol index. This is because the conventional scattered pilots method can only start after both correcting the frequency offset and acquiring the symbol index (as the scattered pilots' positions depend on the symbol index). On the other hand, the continual pilots method provided by the embodiments herein can start once the frequency offset has been corrected as continual pilots exist in the same positions regardless of the symbol index.

Additionally, the obtaining of the correlation coefficient ratio by dividing the second correlation coefficient (c2) by the first correlation coefficient (c1) reduces the noise effect on the Doppler frequency estimation substantially and removes the need to observe the signal for a long time to determine its variance. Also, the performing of the leaky integration across OFDM symbols of the resulting first and second correlation coefficients (c1, c2) to obtain an estimate of the first and second correlation coefficients may comprise switching adaptively between low and high bandwidth forgetting factors resulting in a perfect compromise between quickly tracking Doppler frequency changes and not responding to instantaneous noisy changes.

Moreover, the method may further comprise determining if the value of the counter is equal to the value of a predefined register. The method may further comprise determining if a value of the averaging counter is equal to a value of an averaging window size to obtain a short-term estimate of the correlation coefficient ratio. Additionally, the method may further comprise incrementing the averaging counter by one. Also, the method may further comprise comparing the short-term estimate of the instantaneous non-leaky-integrated correlation coefficient ratio with the resulting long-term leaky-integrated divided correlation coefficient to determine if a predetermined threshold is reached. In this regard, the calculated raw correlation coefficients c1 and c2 go through two paths. In one path, each of the raw c1 and c2 are leaky integrated. In the second path, these raw (non-leaky integrated) coefficients are accumulated for a certain period (averaging window size). Therefore, if the averaging counter does not reach the averaging window size, then the accumulated c1 and c2 are updated (accumulated c1=stored accumulated c1+raw c1). Once the averaging window size is reached, the accumulated raw c2 is divided by the accumulated raw c1 to produce the short-term ratio. This is compared with the ratio resulting from dividing the leaky integrated c2 by the leaky integrated c1 at this time.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of an entirely hardware embodiment, an entirely software embodiment or an embodiment including both hardware and software elements. The embodiments that are implemented in software include but are not limited to, firmware, resident software, microcode, etc.

Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
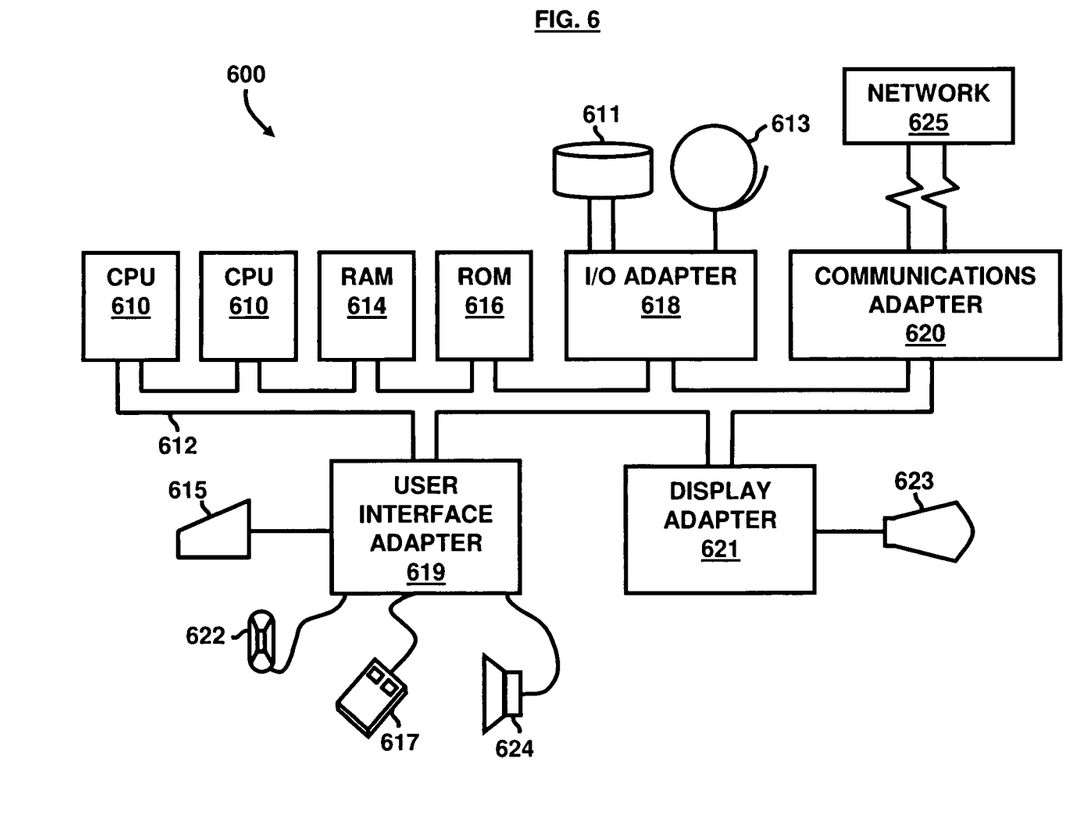
FIG. 6 illustrates a schematic diagram of a computer architecture used in accordance with the embodiments herein.

A representative hardware environment for practicing the embodiments herein is depicted in FIG. 6. This schematic drawing illustrates a hardware configuration of an information handling/computer system 600 in accordance with the embodiments herein. The system comprises at least one processor or central processing unit (CPU) 610. The CPUs 610 are interconnected via system bus 612 to various devices such as a random access memory (RAM) 614, read-only memory (ROM) 616, and an input/output (I/O) adapter 618. The I/O adapter 618 can connect to peripheral devices, such as disk units 611 and tape drives 613, or other program storage devices that are readable by the system. The system can read the inventive instructions on the program storage devices and follow these instructions to execute the methodology of the embodiments herein. The system further includes a user interface adapter 619 that connects a keyboard 615, mouse 617, speaker 624, microphone 622, and/or other user interface devices such as a touch screen device (not shown) to the bus 612 to gather user input. Additionally, a communication adapter 620 connects the bus 612 to a data processing network 625, and a display adapter 621 connects the bus 612 to a display device 623 which may be embodied as an output device such as a monitor, printer, or transmitter, for example.

Unlike some of the conventional techniques, the embodiments herein, to a significant extent, are not sensitive to the received signal-to-noise ratio (SNR). This results from the fact that the embodiments herein use the ratio c2/c1 (not c1/c0) in which the noise term in (1) is insignificant. The adaptive choice of the leaky integrator forgetting factors enables the ability to smooth out the noisy changes and at the same time track Doppler frequency changes quickly.

The Doppler frequency estimated by a mobile terminal directly relates to the mobile terminal velocity through the relation $f_d = v/\lambda$, where $f_d$ is the Doppler frequency, $\lambda$ is the wavelength of the transmitted signal and v is the velocity of the mobile terminal (assuming the transmitter is at rest). The knowledge of a mobile terminal velocity is of great importance in cellular systems where it can significantly assist the handover and power control procedures. Doppler frequency can also be used in a wide range of applications where knowledge of the channel state (Channel State Information, CSI) is required.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for estimating Doppler frequency in a wireless communication system, said method comprising:

determining a first correlation coefficient (c1) between a currently received Orthogonal Frequency Division Multiplexed (OFDM) symbol and an OFDM symbol received previous to said currently received OFDM symbol, and a second correlation coefficient (c2) between said currently received OFDM symbol and an OFDM symbol received immediately previous to said OFDM symbol received previous to said currently received OFDM symbol;

performing a leaky integration across OFDM symbols of the resulting first and second correlation coefficients (c1, c2) to obtain an estimate of the first and second correlation coefficients;

dividing said second correlation coefficient (c2) by said first correlation coefficient (c1) to obtain a correlation coefficient ratio; and using said correlation coefficient ratio as an estimate of said Doppler frequency in said wireless communication system.

2. The method of claim 1, wherein the determining of said first correlation coefficient (c1) and said second correlation coefficient (c2) comprises:

initializing a value of a leaky integrator forgetting factor to a value of an acquisition forgetting factor;

initializing a counter to a value zero;

initializing an averaging counter to a value zero;

filling a 3-symbol First In First Out (FIFO) buffer with said currently received OFDM symbol, said OFDM symbol received previous to said currently received OFDM symbol, and said OFDM symbol received immediately previous to said OFDM symbol received previous to said currently received OFDM symbol;

placing said first correlation coefficient (c1) and said second correlation coefficient (c2) at each bin; and summing said first correlation coefficient (c1) and said second correlation coefficient (c2) over all bins.

3. The method of claim 1, wherein the determining of said first correlation coefficient (c1) and said second correlation coefficient (c2) is performed using continual pilots, wherein the use of continual pilots instead of scattered pilots increases the maximum allowable Doppler frequency that can be estimated without ambiguity and decreases memory required for estimating said Doppler frequency.

4. The method of claim 3, wherein the use of continual pilots enables faster results as continual pilots exist in the same positions regardless of a symbol index associated with said OFDM symbol.

5. The method of claim 1, wherein the obtaining of said correlation coefficient ratio by dividing said second correlation coefficient (c2) by said first correlation coefficient (c1) reduces the noise effect on said Doppler frequency estimation substantially and removes the need to observe a signal for a long time to determine a variance of said signal.

6. The method of claim 1, wherein the performing of said leaky integration across OFDM symbols of the resulting first and second correlation coefficients (c1, c2) to obtain an estimate of the first and second correlation coefficients comprises switching adaptively between low and high bandwidth forgetting factors.

7. The method of claim 1, further comprising determining whether a value of a counter is equal to the value of a predefined register.

8. The method of claim 1, further comprising determining whether a value of an averaging counter is equal to a value of an averaging window size to obtain a short-term estimate of said correlation coefficient ratio.

9. The method of claim 8, further comprising incrementing said averaging counter by one.

10. The method of claim 8, further comprising comparing a short-term estimate of an instantaneous non-leaky-integrated correlation coefficient ratio with a resulting long-term leaky-integrated divided correlation coefficient to determine if a predetermined threshold is reached.

11. An apparatus for estimating Doppler frequency in a wireless communication system, said apparatus comprising:

a first buffering module adapted to generate a complex conjugate of an Orthogonal Frequency Division Multiplexed (OFDM) symbol ($r1^*$) received previous to a currently received OFDM symbol ($r0$);

a second buffering module adapted to generate a complex conjugate of an OFDM symbol ($r2^*$) received one symbol before said OFDM symbol received previous to said currently received OFDM symbol ($r0$);

a first processing module adapted to calculate the real part of the multiplication result of said currently received OFDM symbol ($r0$) and said complex conjugate of said OFDM symbol ($r1^*$) received previous to said currently received OFDM symbol ($r0$) at each bin and adapted to sum the calculated real part of the multiplied results over all bins;

a second processing module adapted to calculate the real part of the multiplication result of said currently received OFDM symbol ($r0$) and said complex conjugate of said OFDM symbol ($r2^*$) received immediately previous to said OFDM symbol received previous to said currently received OFDM symbol ($r0$) at each bin and adapted to sum the calculated real part of the multiplied results over all bins;

a first leaky integrator adapted to leaky integrate the resulting output of said first processing module;

a second leaky integrator adapted to leaky integrate the resulting output of said second processing module; and a divider adapted to divide the resulting output of said second leaky integrator by the resulting output of said first leaky integrator.

12. The apparatus of claim 11, further comprising:

a third processing module adapted to map the resulting output of said divider to a time domain filter, wherein said time domain filter is as wide as the channel; and a hysteresis circuit adapted to prevent cutting of a significant part of the channel caused by said time domain filter.

13. The apparatus of claim 12, wherein said time domain filter adapts its bandwidth in accordance to an estimated Doppler frequency to provide an improvement in system performance as said time domain filter which is as wide as a U-shaped spectrum associated with the channel can remove part of the out-of-band noise.

14. The apparatus of claim 12, wherein said hysteresis circuit prevents choosing a wrong time domain filter which may result if instantaneous noisy estimates are responded and enables quickly tracking possible increases in Doppler frequency and puts a protection on instantaneously responding to decreases in Doppler frequency.

15. The apparatus of claim 11, wherein said first processing module and said second processing module are further adapted to divide the summed result by N, wherein N is the total number of pilots per OFDM symbol.

16. The apparatus of claim 11, wherein said first processing module provides a first correlation coefficient (c1) between said currently received OFDM symbol and said OFDM symbol received previous to said currently received OFDM symbol.

17. The apparatus of claim 11, wherein said second processing module provides a second correlation coefficient (c2) between said currently received OFDM symbol and said OFDM symbol received immediately previous to said OFDM symbol received previous to said currently received OFDM symbol.

18. The apparatus of claim 11, wherein said first buffering module, said second buffering module, said first processing module, and said second processing module utilize continual pilots.

19. The apparatus of claim 11, wherein said first leaky integrator and said second leaky integrator adaptively switches between low and high bandwidth forgetting factors to avoid noisy Doppler frequency estimates.

20. The apparatus of claim 11, wherein said wireless communication system comprises a Digital Video Broadcasting-Handheld (DVB-H) system.

\* \* \* \* \*